(12) United States Patent
Elliot

(10) Patent No.: X1881
(45) Date of Patent: Feb. 17, 1813

(54) PRINTING PRESS, & INK DISTRIBUTOR

(76) Inventor: William Elliot

1881X

William Elliot
Letters Patent: Dated 17th Feby 1813.

The Schedule referred to in these Letters Patent and making part of the same containing a description in the words of the said William Elliot himself of his improvement in the printing press and mode of distributing ink on Types The press consists of a frame or table the top or face of it formed of one or more flat stones firmly fixed in the frame for supporting the forms or sheets of types. and may be made of sufficient length to receive one, two or more forms.. The Tympans and friskets are made in the same way as in the common printing press and may be made to lift or open either on the sides or ends of the frame or table afore=said. The impression is given by a roller of cast iron, brass or any other heavy substance either solid or hollow passing horizontally over the tympan and pressing it on the face of the types which are laid [illegible] on the stones forming the top of the frame or table. This roller is kept in a parallel di=rection by two iron ribs fixed on the top of the frame near the edge [illegible] fitting into corresponding grooves near the ends of the roller and is moved by two endless ropes or bands passing round wheels on a winch fixed near the center of the frame over small wheels placed near to each end of the frame and round the wheels attached to each end of the roller and by turning the winch the roller is moved with ease either backwards or forwards or the roller may be moved by a movable rack and pinion or by straps or by any other method that will carry it over the face of the types with a steady and equable motion The improvement in beating or distribu=ting the ink on the types consists in using one or two large balls suspended to the arm of crane by a spiral spring and chain by which the workman is enabled to use large balls and distribute the ink better with less labor or the ball or balls may be suspended by a rope or chain to a spring of wood or metal attached to the arm of a crane The mode of using this improvement is by passing the roller over the types instead of pressure by a screw and has the advantage of printing two forms or sheets in nearly the same time as one can be printed in the common way and produces a more perfect impression Witneſses Thos Haynes. H. Haynes 336 Wm Elliot Patent Office [illegible]

Received and Recorded anew from original [illegible] Patent. October 19. 1853.